Aug. 20, 1929.    P. A. PETERSON    1,725,475
FENCE POST CLAMP
Filed Dec. 16, 1927
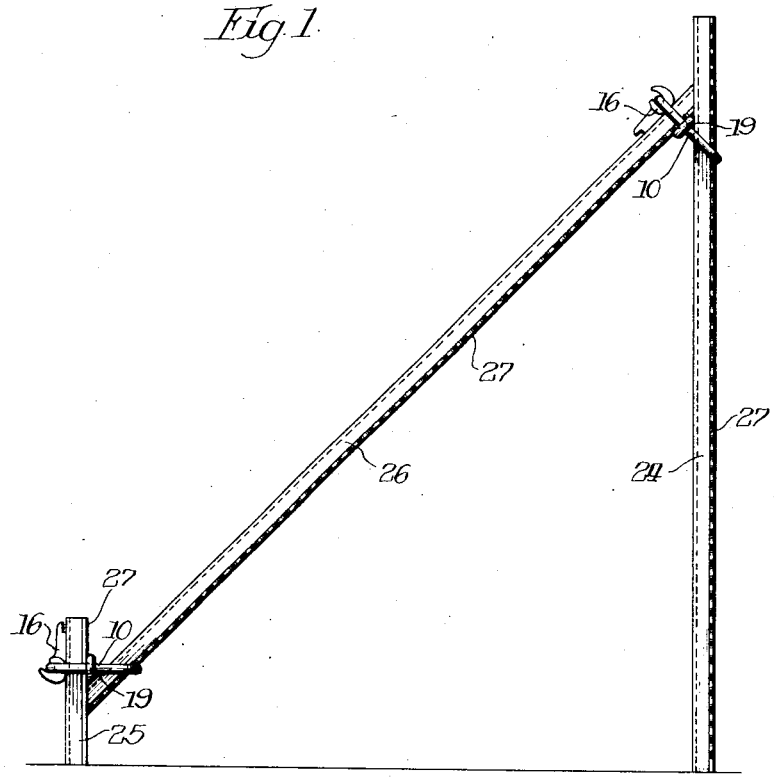
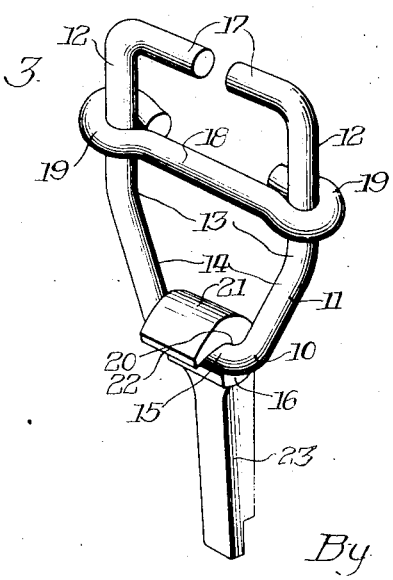
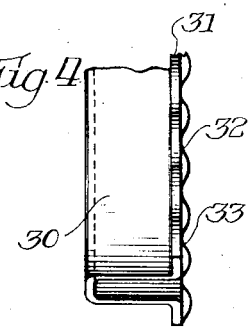
Inventor
Paul A. Peterson.
By D. Anthony Usina
Atty.

Patented Aug. 20, 1929.

1,725,475

UNITED STATES PATENT OFFICE.

PAUL A. PETERSON, OF DULUTH, MINNESOTA.

FENCE-POST CLAMP.

Application filed December 16, 1927. Serial No. 240,425.

This invention pertains to fence post clamps, and more specifically to that class of clamps adapted to interlock with posts or the like to secure the same in relative fixed position.

It has been usual in fastening members such as posts together to effect a union by means of welding, nut and bolt, rivet, etc., connections, all requiring expensive apparatus and/or preliminary operations on the posts.

It is therefore an object of this invention to provide a simple, effective and inexpensive clamp sufficient in itself to perform securing functions.

Another object is to provide a clamp operative in any position and under any conditions to effect holding of posts or the like in relative fixed positions.

A further object is to provide a clamp for effecting rigid connections between members without the necessity of any preliminary operation on said members.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a side elevation of an assembly of fence post, anchor post and brace, the same being secured together by means of the clamp, which is the subject-matter of this invention;

Figure 2 is a side elevation of a post and extension, the same being secured together by means of the clamp, which is the subject-matter of this invention;

Figure 3 is an enlarged perspective of the clamp assembly; and

Figure 4 is an enlarged fragmentary side elevation of a different form of fence post than that illustrated in Figures 1 and 2.

As illustrated, the clamp 10 consists of a body member 11 having spaced parallel shank portions 12 knuckled at 13 to provide connections 14 between the shank 12 and a seat 15, said seat being of a proportion sufficient to accommodate a cam member 16. The shanks 12 terminate in portions 17 which are disposed substantially parallel to the seat 15 and spaced therefrom and the shanks are also provided with a cross brace 18 having encircling portions, thereby strengthening and preventing spreading of the member 11. The cam member 16 is provided with a seat engaging portion or slot 20 substantially U-shaped and having a cam portion 21 terminating in a lip 22, a handhold or operating member 23 being provided for effecting movement of said cam member.

Referring first of all to the assembly illustrated in Figure 1, the fence post 24, the anchor post 25 and the brace 26 are all formed of members substantially U-shaped in cross-section, terminating in outwardly extending flanges 27 corrugated or formed in such a manner as to provide locking indentations or recesses therein.

In assembling these posts, it is only necessary to position the brace 26 in the desired position between the fence post and the anchor post, placing the clamps 10 together with their cam members 16 in post encircing position, and to move the cam members 16 about their seat 15 into the locking position as shown, with the slots 20 disposed away from the posts. It will be seen that the shanks 12 engage in the locking recesses provided in the flanges 27 of the post, and where the brace members 18 are used, the same may be positioned in such a manner as to be between the brace and the post. Should it be desired to use a shorter clamp 10, it is only necessary to bend or distort the shanks 12 substantially at the knuckles 13 to draw the seat 15 in the direction of the terminal portions 17 it being understood that the brace 18 will conveniently prevent distortion of the remainder of the clamp during the distorting of the shank.

Referring now more particularly to Figure 2, the post 28 and the extension 29 may be of substantially the same configuration as already described for post 27, and in this case, it is only necessary to place the extension in the position desired, encircling both the post and extension with the members 10 and their locking cams 16, and moving the cams to wedging or locked position as shown in the figure in a manner as already described.

It will readily be appreciated that any form of fence post may be used, as for instance, that shown in Figure 4 in which the post 30 is substantially U-shaped in cross section, and is provided with outwardly extending flanges 31 which as hereinbefore pointed out, are formed with locking recesses 32 extending in the direction of said flanges, and said flanges may also be provided with locking recesses 33 extending in a direction normal to the flanges 31, it being understood of course that recesses 32 may or may not be used. In case this post is used in the assembly described, no change need be made in the locking clamps described or their function as the clamp 10 substantially encircles the post assembly, engaging the recesses for interlocking in a manner and for the purpose already pointed out.

It is to be understood that I do not wish to be limited by the exact embodiments of the invention shown, which are merely by way of illustration and not limitation, as various and other forms of the device will of course readily occur to those skilled in the art.

I claim:

1. A structural assemblage comprising, in combination, an upright structural member, a sloping member disposed with one end resting on the upright member and adapted to serve as a brace therefor, and a securing clamp adapted to encircle both the upright member and the sloping brace member, and operable by means of a lever to apply clamping pressure to the members to maintain them in assembled relation.

2. A structural assemblage comprising, in combination, an upright structural member, a sloping member disposed with one end resting on the upright member and adapted to serve as a brace therefor, and a securing clamp adapted to encircle both the upright member and the sloping brace member, and operable by means of a lever to apply clamping pressure to the members to maintain them in assembled relation, said securing clamp comprising a body portion terminating in inwardly extending portions disposed in the same approximate plane of the body portion.

3. A structural assemblage comprising, in combination, a plurality of spaced upright members, a brace member extending from the upper portion of one of the upright members, downwardly and outwardly to the other upright member, and a plurality of clamp members for maintaining the upright members and the brace member in assembled relation, said clamp being provided with an encircling body portion terminating in inwardly extending end portions, and means for actuating the clamp to move the latter into clamping engagement with the members encircled by the body portion.

4. A structural assemblage comprising in combination an upright structural member, a sloping structural member disposed with one end resting on the upright member and adapted to serve as a brace therefor, projections formed on an outer surface of one of the structural members and a clamp adapted to secure the members in an assembled relation, the clamp being provided with means for cooperatively engaging the projections.

5. A clamp for general use having a body portion formed of parallel shank pieces terminating at one end in inwardly extending portions and at the opposite end in converging connecting members, a seat arranged to extend between the converged ends of the connecting members and an operating lever carried by the seat, the connecting members, the shank pieces and the inwardly extending portions being all disposed substantially within a single plane.

6. A clamp for general use having a body portion formed of parallel reinforced shank pieces terminating at one end in inwardly extending portions and at the opposite end in converging connecting members, a seat arranged to extend between the converged end of the connecting members and an operating cam lever carried by the seat; the connecting members, the shank pieces and the inwardly extending portions being all disposed substantially within a single plane.

Signed at Duluth, Minnesota, this 9th day of December, 1927.

PAUL A. PETERSON.